(12) United States Patent
Gao et al.

(10) Patent No.: US 10,885,858 B2
(45) Date of Patent: Jan. 5, 2021

(54) ARRAY SUBSTRATE, DISPLAY PANEL, DISPLAY DEVICE AND METHOD FOR DESIGNING DISPLAY PANEL

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jilei Gao, Beijing (CN); Jinliang Liu, Beijing (CN); Yang Zhang, Beijing (CN); Xuebing Jiang, Beijing (CN); Songmei Sun, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 9 days.

(21) Appl. No.: 15/753,340

(22) PCT Filed: Jul. 13, 2017

(86) PCT No.: PCT/CN2017/092796
§ 371 (c)(1),
(2) Date: Feb. 19, 2018

(87) PCT Pub. No.: WO2018/054138
PCT Pub. Date: Mar. 29, 2018

(65) Prior Publication Data
US 2020/0219456 A1 Jul. 9, 2020

(30) Foreign Application Priority Data
Sep. 26, 2016 (CN) .......................... 2016 1 0852431

(51) Int. Cl.
*G09G 3/36* (2006.01)
*G02F 1/1343* (2006.01)
(Continued)

(52) U.S. Cl.
CPC ......... *G09G 3/3607* (2013.01); *G02F 1/1362* (2013.01); *G02F 1/134309* (2013.01);
(Continued)

(58) Field of Classification Search
CPC .. G09G 3/3607; G09G 3/2074; G09G 3/2003; G02F 1/134309; G02F 1/1362;
(Continued)

(56) References Cited

U.S. PATENT DOCUMENTS

2002/0012084 A1    1/2002  Yoon et al.
2008/0143897 A1*   6/2008  Chang ............... G02F 1/134363
                                                         349/33
(Continued)

FOREIGN PATENT DOCUMENTS

CN      101206359 A     6/2008
CN      104238206 A    12/2014
(Continued)

OTHER PUBLICATIONS

International Search Report and Written Opinion for Application No. PCT/CN2017/092796, dated Oct. 18, 2017, 10 Pages.

*Primary Examiner* — Andrew Sasinowski
(74) *Attorney, Agent, or Firm* — Brooks Kushman P.C.

(57) ABSTRACT

An array substrate, a display panel, a display device and a method for designing the display panel are provided. The array substrate includes a plurality of pixel units, wherein each of the pixel units includes a plurality of sub-pixels, each of the sub-pixels includes a pixel electrode, and the pixel electrode includes a plurality of strip-shaped sub-pixel electrodes arranged in a comb-teeth form, and the sub-pixels
(Continued)

of one of the pixel units include at least two sub-pixels. A width of the strip-shaped sub-pixel electrode of any one of the at least two sub-pixels is different from a width of the strip-shaped sub-pixel electrode of any other one of the at least two sub-pixels, and/or an interval between the strip-shaped sub-pixel electrodes of any one of the at least two sub-pixels is different from an interval between the strip-shaped sub-pixel electrodes of any other one of the at least two sub-pixels.

14 Claims, 4 Drawing Sheets

(51) Int. Cl.
  *G02F 1/1362* (2006.01)
  *G09G 3/20* (2006.01)
(52) U.S. Cl.
  CPC ......... *G09G 3/2003* (2013.01); *G09G 3/2074* (2013.01); *G02F 2001/136254* (2013.01); *G02F 2201/123* (2013.01); *G02F 2201/52* (2013.01)

(58) Field of Classification Search
  CPC ........... G02F 2201/52; G02F 2201/123; G02F 2001/136254
  See application file for complete search history.

(56) References Cited

U.S. PATENT DOCUMENTS

| | | |
|---|---|---|
| 2014/0362322 A1 | 12/2014 | Park et al. |
| 2015/0226994 A1 | 8/2015 | Yonemura |
| 2017/0039921 A1 | 2/2017 | Chen et al. |

FOREIGN PATENT DOCUMENTS

| | | |
|---|---|---|
| CN | 104614904 A | 5/2015 |
| CN | 106154658 A | 11/2016 |
| CN | 206039106 U | 3/2017 |
| KR | 20080026908 A | 3/2008 |

* cited by examiner

ARRAY SUBSTRATE, DISPLAY PANEL, DISPLAY DEVICE AND METHOD FOR DESIGNING DISPLAY PANEL

CROSS-REFERENCE TO RELATED APPLICATION APPLICATIONS

This application is the U.S. national phase of PCT Application No. PCT/CN2017/092796 filed on Jul. 13, 2017, which claims priority to Chinese Patent Application No. 201610852431.X filed on Sep. 20, 2016, which are incorporated herein by reference in their entireties.

TECHNICAL FIELD

The present disclosure relates to the field of display technology, in particular to an array substrate, a display panel, a display device and a method for designing the display panel.

BACKGROUND

Presently, a thin film transistor liquid crystal display (TFT-LCD) panel is one of mainstreams of flat panel displays, which has advantages such as a small size, low power consumption, no radiation and low manufacturing cost. With the development of the display industry and the improvement of social and material level, the requirements for display are becoming increasingly high, and the requirements for image quality and color saturation are also becoming stricter.

A liquid crystal display panel in the related art includes a plurality of pixels arranged in an array, each of which includes three sub-pixels of red (R), green (G), and blue (B). R, G and B color filters used in the related art are absorption color layers. As a result, when the light is incident, only the light with the corresponding color can penetrate, and the light with the other two colors is absorbed. Therefore, a transmittance of the display panel is low, and the transmittances of the R, G and B sub-pixels are different. Accordingly, a display technology of forming four sub-pixels of red, green, blue and white (W) in one pixel is proposed. The W sub-pixel is not provided with the color layer, and the transmittance of the W sub-pixel is controlled through a corresponding gray scale, which may improve the transmittance of the display panel. Currently, liquid crystal display panels with the RGBW four sub-pixels have been widely used in the LCDs. However, since the W sub-pixels are added to the display panel, the color saturation of a color image observed by human eyes is reduced, the color is not bright enough, and the displayed image is whitened.

SUMMARY

In view of the above, the present disclosure provides an array substrate, a display panel, a display device and a method for designing the display panel, to solve the problem of a low color saturation of a display panel in the related art.

In order to solve the above technical problem, the present disclosure provides an array substrate. The array substrate includes a plurality of pixel units, wherein each of the pixel units includes a plurality of sub-pixels, each of the sub-pixels includes a pixel electrode, and the pixel electrode includes a plurality of strip-shaped sub-pixel electrodes arranged in a comb-teeth form, and the sub-pixels of one of the pixel units include at least two sub-pixels. A width W of each strip-shaped sub-pixel electrode of any one of the at least two sub-pixels is different from a width W of each strip-shaped sub-pixel electrode of any other one of the at least two sub-pixels, or an interval S between the strip-shaped sub-pixel electrodes of any one of the at least two sub-pixels is different from an interval S between the strip-shaped sub-pixel electrodes of any other one of the at least two sub-pixels, or the width W of each strip-shaped sub-pixel electrode of any one of the at least two sub-pixels is different from the width W of each strip-shaped sub-pixel electrode of any other one of the at least two sub-pixels and the interval S between the strip-shaped sub-pixel electrodes of any one of the at least two sub-pixels is different from the interval between the strip-shaped sub-pixel electrodes of any other one of the at least two sub-pixels.

In some embodiments, the respective numbers of the strip-shaped sub-pixel electrodes of the at least two sub-pixels are different.

In some embodiments, the sub-pixels of the one pixel unit include at least one sub-pixel, and a ratio of the width W of the strip-shaped sub-pixel electrode of the least one sub-pixel to the interval S between the strip-shaped sub-pixel electrodes of the least one sub-pixel is less than 1.

In some embodiments, the sub-pixels of each pixel unit at least include a red sub-pixel, a green sub-pixel and a blue sub-pixel.

In some embodiments, the sub-pixels of each pixel unit further include a white sub-pixel.

In some embodiments, an interval between the strip-shaped sub-pixel electrodes of the red sub-pixel is larger than an interval between the strip-shaped sub-pixel electrodes of the green sub-pixel, and an interval between the strip-shaped sub-pixel electrodes of the blue sub-pixel is smaller than the interval between the strip-shaped sub-pixel electrodes of the green sub-pixel.

In some embodiments, an interval between the strip-shaped sub-pixel electrodes of the white sub-pixel is equal to the interval between the strip-shaped sub-pixel electrodes of the green sub-pixel, and a width of each strip-shaped sub-pixel electrode of the white sub-pixel is equal to a width of each strip-shaped sub-pixel electrode of the green sub-pixel.

In some embodiments, an optical path difference of a display panel including the array substrate is 275 nm, and each of a width of the strip-shaped sub-pixel electrode of the red sub-pixel and a width of the strip-shaped sub-pixel electrode of the blue sub-pixel is less than the width of the strip-shaped sub-pixel electrode of the green sub-pixel.

The present disclosure further provides a display panel, which includes the above array substrate.

In some embodiments, a transmittance of the display panel is greater than a preset threshold.

The present disclosure further provides a display device, which includes the above display panel.

The present disclosure further provides a method for designing a display panel. The display panel includes an array substrate. The array substrate includes a plurality of pixel units, wherein each of the pixel units includes a plurality of sub-pixels, each of the sub-pixels includes a pixel electrode, and the pixel electrode includes a plurality of strip-shaped sub-pixel electrodes arranged in a comb-teeth form. The method includes: a testing step for testing a transmittance of the display panel, to determine whether the transmittance of the display panel satisfies a preset threshold; a determining step for determining the display panel to be a standard display panel in response to determining that the transmittance of the display panel satisfies the preset threshold; and an adjusting step for adjusting, in response to determining that the transmittance of the display panel does not satisfy the preset threshold, a width W of each strip-shaped sub-pixel electrode of at least one of the sub-pixels in the pixel unit of the array substrate, and/or an interval S between the strip-shaped sub-pixel electrodes of the at least one sub-pixel, and returning to the testing step.

The beneficial effects of the above technical solution according to the present disclosure are as follows. Different widths W and/or different intervals S of the strip-shaped sub-pixel electrodes are designed for different sub-pixels in the pixel unit to improve the transmittance of the sub-pixel as required. Therefore, a dynamic range of color adjustment is increased, and the color saturation is improved, which improves the image quality of the display device including the array substrate.

DETAILED DESCRIPTION

Figure 1:
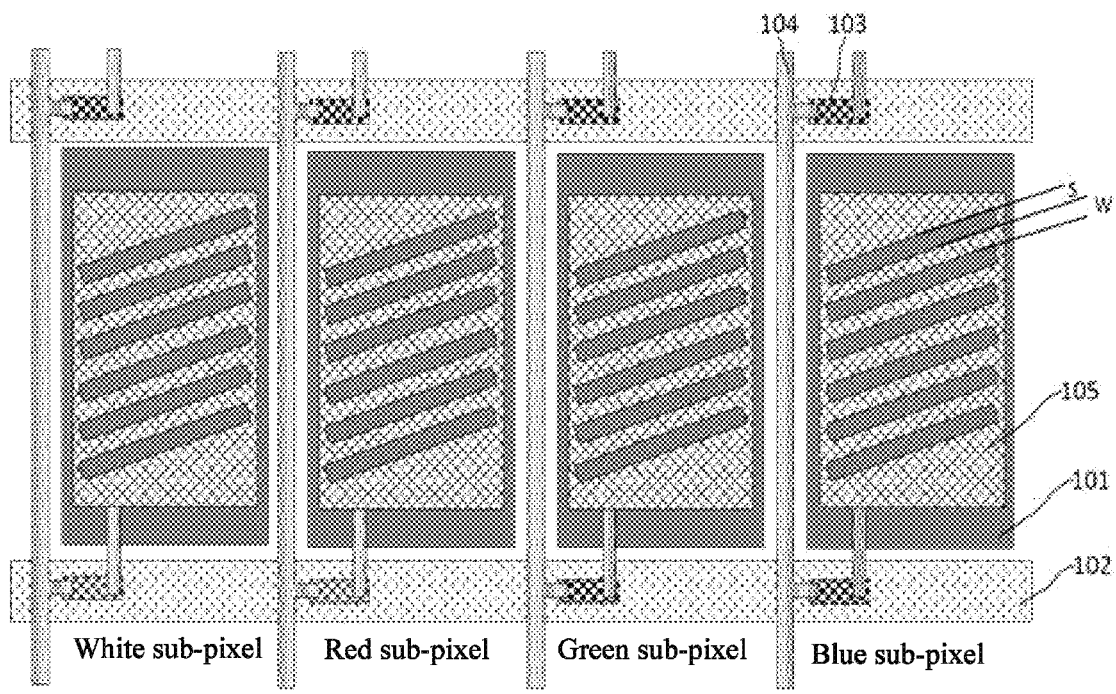
FIG. 1 is a schematic diagram of an array substrate in an ADS mode.
Figure 2:
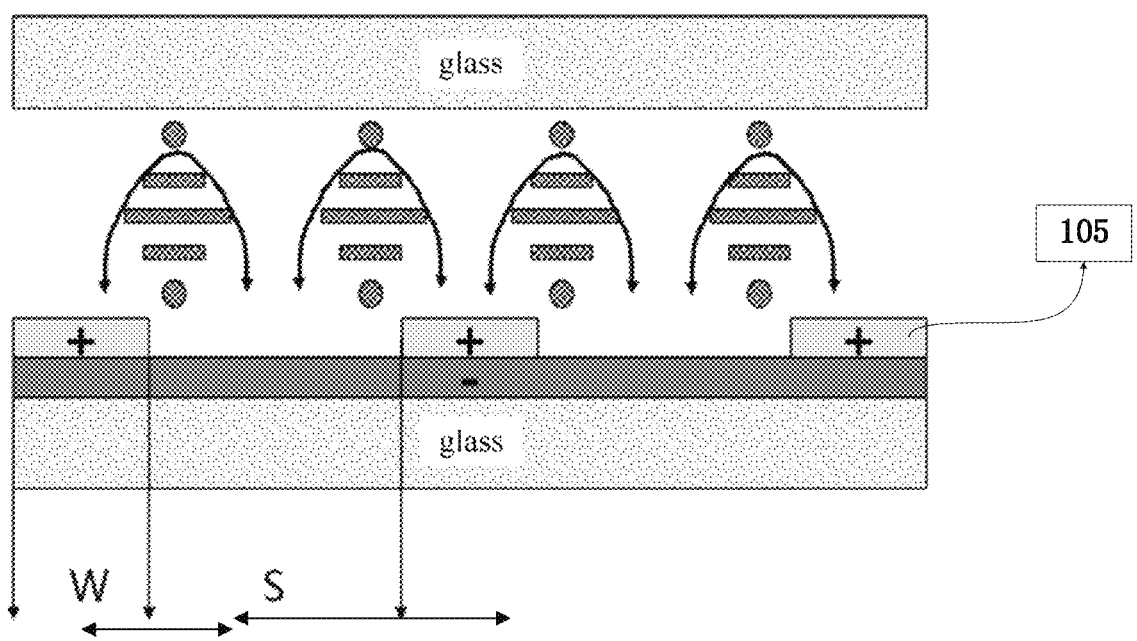
FIG. 2 is a sectional view of a pixel electrode as shown in FIG. 1.

Reference is made to FIG. 1, which is a schematic diagram of an array substrate in an Advanced super Dimension Switch mode (ADS mode). The array substrate includes a plurality of gate lines 102 and a plurality of data lines 104 arranged in a cross manner to define a plurality of pixel units. Each of the pixel units includes a red (R) sub-pixel, a green (G) sub-pixel, a blue (B) sub-pixel and a white (W) sub-pixel, and each sub-pixel includes a common electrode 101, a pixel electrode 105 and a thin film transistor. As shown in FIG. 1, the reference sign 103 represents an active layer of the thin film transistor. The pixel electrode 105 includes a plurality of strip-shaped sub-pixel electrodes arranged in a comb-teeth form to enhance the fringing field effect. Reference is made to FIG. 2, which is a sectional view of the pixel electrode as shown in FIG. 1.

A width W of the strip-shaped sub-pixel electrode and an interval S between the strip-shaped sub-pixel electrodes are important parameters for determining a transmittance of a display panel including the array substrate. Specific experiments will be described below.

Figure 3:
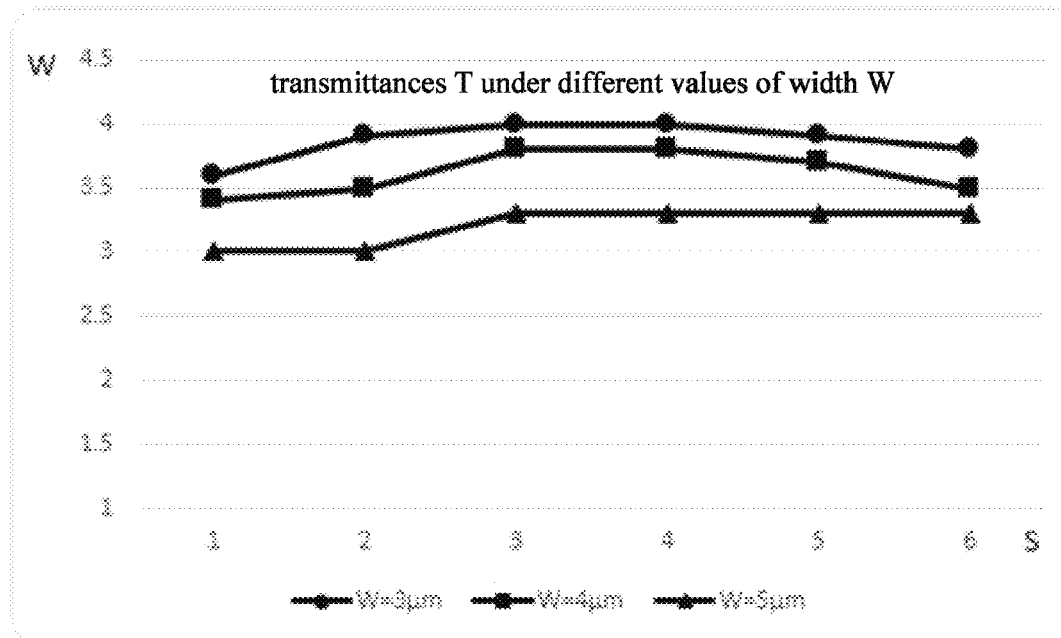
FIG. 3 is a schematic diagram of simulation curves of transmittances of a display panel in an ADS mode at a constant interval S and at different widths W of strip-shaped sub-pixel electrodes.

Reference is made FIG. 3, which is a schematic diagram of transmittance curves of the display panel in an ADS mode at a constant interval S and at different widths W of strip-shaped sub-pixel electrodes. As shown in FIG. 3, the abscissa represents the interval S of the strip-shaped sub-pixel electrode in units of μm, and the ordinate represents the transmittance T of the display panel. FIG. 3 shows the respective transmittance curves of the display panel when a value of W is 3 μm, 4 μm and 5 μm. It can be seen from FIG. 3 that, when the interval S between the strip-shaped sub-pixel electrodes is constant, the larger the width W of the strip-shaped sub-pixel electrodes is, and the lower the transmittance is.

Figure 4:
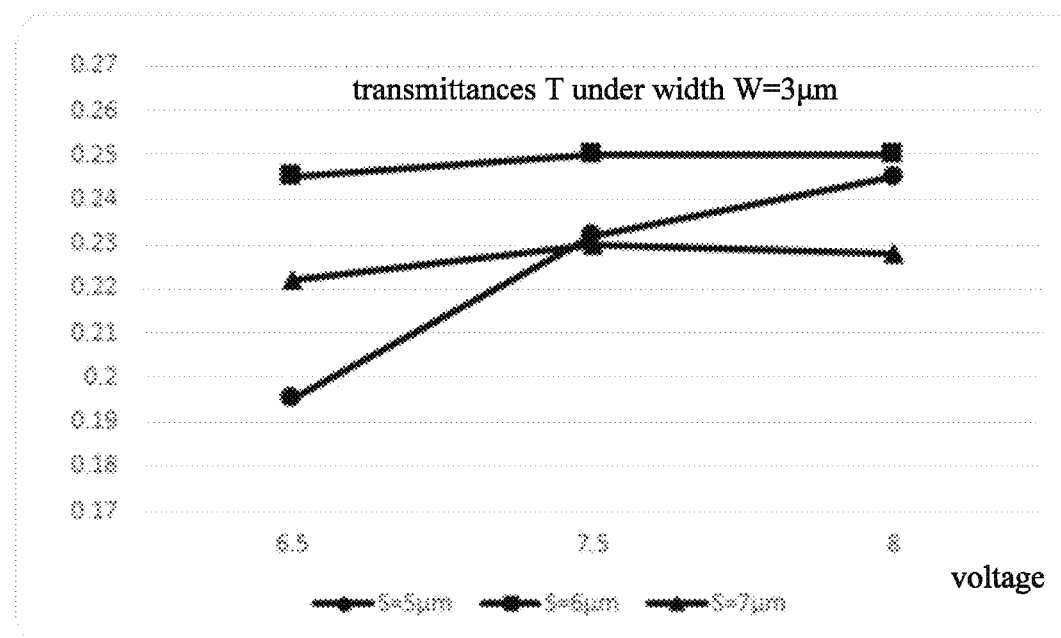
FIGS. 4-6 each is a schematic diagram of simulation curves of transmittances of display panels in an ADS mode at a constant width W and at different intervals S of strip-shaped sub-pixel electrodes.
Figure 5:
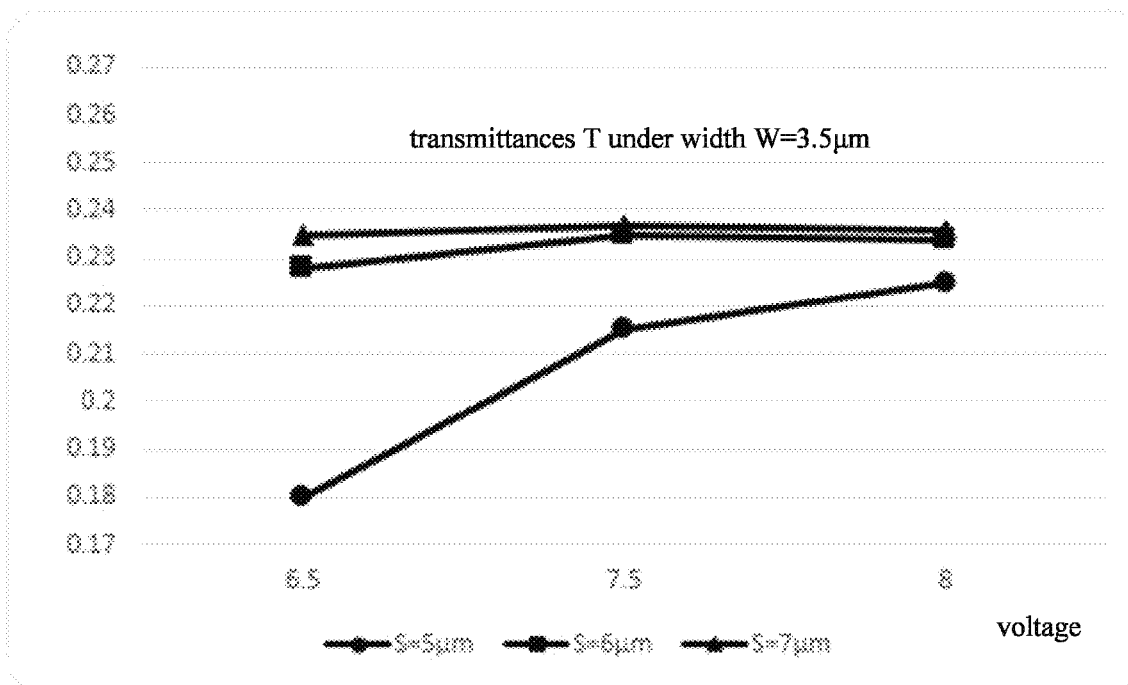
Figure 6:
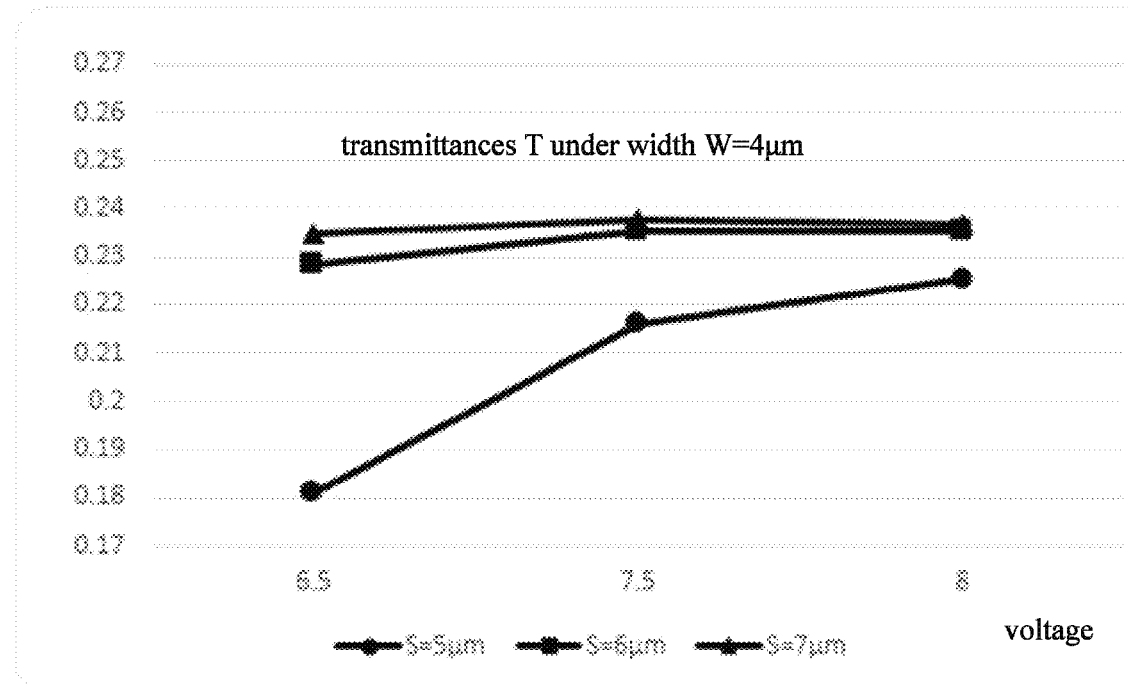

Reference is made to FIGS. 4-6, each of which is a schematic diagram of simulation curves of transmittances of display panels in an ADS mode at a constant width W and at different intervals S of strip-shaped sub-pixel electrodes. As shown in FIGS. 4-6, the abscissa is a voltage applied to the pixel electrode, and the ordinate is the transmittance T of the display panel.

FIG. 4 is a schematic diagram of transmittance curves of display panels in a case that the width W of the strip-shaped sub-pixel electrode is 3 μm, and pixel voltages of 6.5V, 7.5V and 8V are applied to the display panels with the intervals S=5 μm, 6 μm and 7 μm between the strip-shaped sub-pixel electrodes, respectively. It can be seen from FIG. 4 that, the transmittance of the display panel with the interval S=6 μm between the strip-shaped sub-pixel electrodes is higher than each of the transmittances of the display panels with the intervals S=5 μm and 7 μm between the strip-shaped sub-pixel electrodes, and the transmittance of the display panel with the interval S=6 μm between the strip-shaped sub-pixel electrodes has a stable change regarding the pixel voltage. In a case of the interval S=5 μm between the strip-shaped sub-pixel electrodes, the transmittance of the display panel varies greatly with the voltage, which may cause an inversion problem. The transmittance of the display panel in a case of the interval S=7 μm between the strip-shaped sub-pixel electrodes, is 10% lower than that in a case of the interval electrodes S=6 μm between the strip-shaped sub-pixel.

FIG. 5 is a schematic diagram of transmittance curves of display panels in a case that the width W of the strip-shaped sub-pixel electrode is 3.5 μm, and the pixel voltages of 6.5V, 7.5V and 8V are applied to the display panels with the intervals S=5 μm, 6 μm and 7 μm between the strip-shaped sub-pixel electrodes, respectively. It can be seen from FIG. 5 that, the transmittance of the display panel with the interval S=7 μm between the strip-shaped sub-pixel electrodes is the highest and stable.

FIG. 6 is a schematic diagram of transmittance curves of display panels in a case that the width W of the strip-shaped sub-pixel electrodes is 4 μm, and the pixel voltages of 6.5V, 7.5V and 8V are applied to the display panels with the intervals S=5 μm, 6 μm and 7 μm of the strip-shaped sub-pixel electrodes, respectively. It can be seen from FIG. 6 that, the transmittance of the display panel with the interval S=7 μm between the strip-shaped sub-pixel electrodes is higher than each of the transmittances of the display panels with the intervals S=5 μm and 6 μm between the strip-shaped sub-pixel electrodes.

Figure 7:
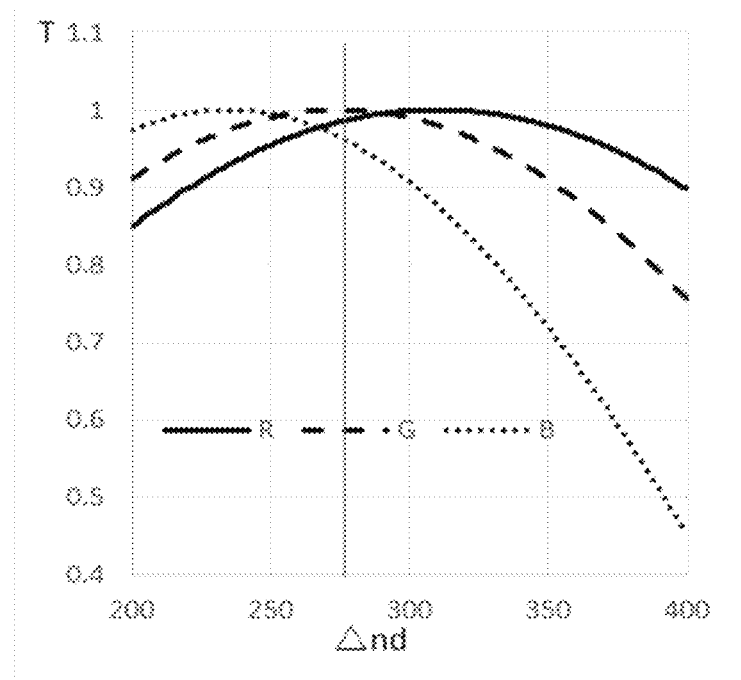
FIG. 7 is a schematic diagram of transmittance curves of a R sub-pixel, a G sub-pixel and a B sub-pixel on a display panel under different optical path differences.

The formula for calculating the transmittance of each of the sub-pixels in the display panel may be:

$$T = \frac{1}{2}\sin^2 2\varphi \sin^2 \frac{\pi \Delta n d}{\lambda},$$

where T is the transmittance of the sub-pixel, φ is an angle between a transmitted light and the normal of the display panel, Δnd is an optical path difference of the light transmitted through the display panel, the optical path difference is mainly determined by a refractive index of liquid crystal and a cell thickness of the display panel, and λ is a wavelength of the transmitted light of the sub-pixel. It can be seen from the formula that the transmittances are different for the sub-pixels of different colors under a same optical path difference. In addition, the transmittances are different for the same sub-pixel under different optical path differences. Reference is made to FIG. 7, which is a schematic diagram of transmittance curves of a R sub-pixel, a G sub-pixel and a B sub-pixel in a display panel under different optical path differences (unit: nm).

It can be seen from the above experiment results that, the width W of the strip-shaped sub-pixel electrode and the interval S between the strip-shaped sub-pixel electrodes are important parameters for determining the transmittance of the display panel, and the transmittance of the display panel may vary along with a variation of the width W of the strip-shaped sub-pixel electrode and the interval S between the strip-shaped sub-pixel electrodes.

In order to improve the transmittance and the color saturation of the display panel, embodiments of the present disclosure provide an array substrate. The array substrate includes a plurality of pixel units, and each of the pixel units includes a plurality of sub-pixels. Each of the sub-pixels includes a pixel electrode, and the pixel electrode includes a plurality of strip-shaped sub-pixel electrodes arranged in a comb-teeth form. The sub-pixels of one of the pixel units include at least two sub-pixels. A width of the strip-shaped sub-pixel electrode of any one of the at least two sub-pixels is different from a width of the strip-shaped sub-pixel electrode of any other one of the at least two sub-pixels, and/or an interval between the strip-shaped sub-pixel electrodes of any one of the at least two sub-pixels is different from an interval between the strip-shaped sub-pixel electrodes of any other one of the at least two sub-pixels.

That is, for different sub-pixels in the pixel unit, different widths W and/or intervals S of the strip-shaped sub-pixel electrodes may be designed to improve the transmittance of the sub-pixel as required. In such a manner, the dynamic range of color adjustment is increased, and the color saturation is improved, which improves the image quality of a display device including the array substrate.

In the above embodiments, the numbers of the strip-shaped sub-pixel electrodes in the at least two sub-pixels may be the same or different. In a case that the widths or the intervals of the strip-shaped sub-pixel electrodes in the at least two sub-pixels are different, the numbers of the strip-shaped sub-pixel electrodes in the at least two sub-pixels are required to be different to achieve nearly the same electrode coverage area.

In the above embodiments, the sub-pixels of the one pixel unit include at least one sub-pixel, and a ratio of the width W of the strip-shaped sub-pixel electrode of the least one sub-pixel to the interval S between the strip-shaped sub-pixel electrodes of the least one sub-pixel is less than 1. That is, the width W is smaller, and the interval S is larger, such that the transmittance may be further improved. Obviously, the above ratio is greater than zero.

In the above embodiments, the sub-pixels of one of the pixel units at least include a red sub-pixel, a green sub-pixel and a blue sub-pixel.

In some embodiments, the sub-pixels of one of the pixel units further include a white sub-pixel.

That is, the display panel including the array substrate may be a RGB display substrate, or a RGBW display substrate.

Figure 8:
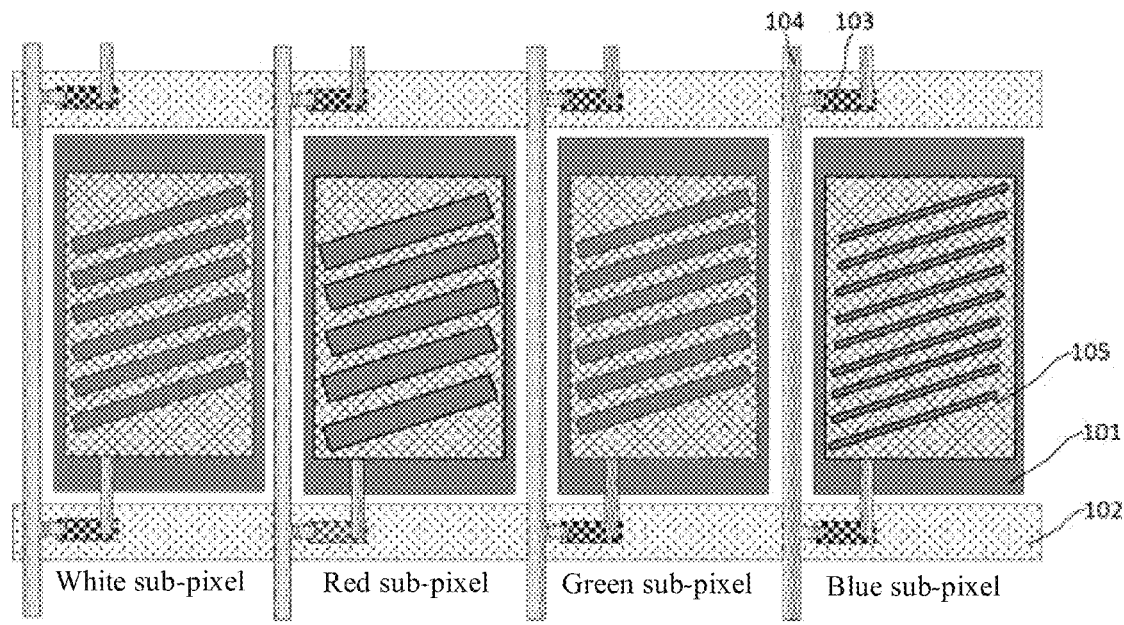
FIG. 8 is a schematic diagram of an array substrate according to embodiments of the present disclosure.

Reference is made to FIG. 8, which is a schematic diagram of an array substrate according to embodiments of the present disclosure. The array substrate includes a plurality of gate lines 102 and a plurality of data lines 104 arranged in a cross manner to define a plurality of pixel units. Each of the pixel units includes a red (R) sub-pixel, a green (G) sub-pixel, a blue (B) sub-pixel and a white (W) sub-pixel, and each sub-pixel includes a common electrode 101, a pixel electrode 105 and a thin film transistor. As shown in FIG. 8, the reference sign 103 represents an active layer of the thin film transistor. The pixel electrode 105 includes a plurality of strip-shaped sub-pixel electrodes arranged in a comb-teeth form to enhance the fringing field effect. It can be seen from FIG. 8 that, the W sub-pixel and the G sub-pixel have the same pixel electrodes, the same number of the strip-shaped sub-pixel electrodes, and the same width of the strip-shaped sub-pixel electrode and the same interval between the strip-shaped sub-pixel electrodes. The number of the strip-shaped sub-pixel electrodes of the R sub-pixel is less than each of the number of the strip-shaped sub-pixel electrodes of the W sub-pixel and the number of the strip-shaped sub-pixel electrodes of the G sub-pixel, and an interval between the strip-shaped sub-pixel electrodes of the R sub-pixel is obviously larger than each of an interval between the strip-shaped sub-pixel electrodes of the W sub-pixel and an interval between the strip-shaped sub-pixel electrodes of the G sub-pixel. The number of the strip-shaped sub-pixel electrodes of the B sub-pixel is greater than the number of the strip-shaped sub-pixel electrodes of the W sub-pixel and the number of the strip-shaped sub-pixel electrodes of the G sub-pixel, and an interval between the strip-shaped sub-pixel electrodes of the B sub-pixel is obviously smaller than each of an interval between the strip-shaped sub-pixel electrodes of the W sub-pixel and an interval between the strip-shaped sub-pixel electrodes of the G sub-pixel.

In a case that that an optical path difference of the display panel including the array substrate is 275 nm, the transmittance of the G sub-pixel is high and the transmittances of the R sub-pixel and the B sub-pixel are low. In this case, the widths of the strip-shaped sub-pixel electrodes of the R sub-pixel and the B sub-pixel may be reduced to improve the transmittance of the pixel.

In the embodiments of the present disclosure, different widths and/or intervals of the strip-shaped sub-pixel electrodes are designed for the R, G and B sub-pixels to improve the transmittance of the sub-pixel. Moreover, the width of the strip-shaped sub-pixel electrode and the interval between the strip-shaped sub-pixel electrodes of the W sub-pixel are unnecessary to be limited, which may be flexibly adjusted. In such a manner, red, green, blue or a combination thereof is brighter during the display. Even with the impact of the W sub-pixel, the color is more vivid, and the color saturation is higher.

The present disclosure further provides a display panel, which includes the above array substrate.

In some embodiments, the transmittance of the display panel is greater than a preset threshold.

The preset threshold may be set according to experiment requirements or factory requirements of the display panel.

The present disclosure further provides a display device, which includes the above display panel.

The present disclosure further provides a method for designing a display panel. The display panel includes an array substrate. The array substrate includes a plurality of pixel units, wherein each of the pixel units includes a plurality of sub-pixels, each of the sub-pixels includes a pixel electrode, and the pixel electrode includes a plurality of strip-shaped sub-pixel electrodes arranged in a comb-teeth form. The method includes: a testing step for testing a transmittance of the display panel, to determine whether the transmittance of the display panel satisfies a preset threshold; a determining step for determining the display panel to be a standard display panel in response to determining that the transmittance of the display panel satisfies the preset threshold; and an adjusting step for adjusting, in response to determining that the transmittance of the display panel does not satisfy the preset threshold, a width W of the strip-shaped sub-pixel electrode of at least one of the sub-pixels in the pixel unit of the array substrate, and/or an interval S between the strip-shaped sub-pixel electrodes of the at least one sub-pixel, and returning to the testing step.

The above are merely the preferred embodiments of the present disclosure. A person skilled in the art may make further modifications and improvements without departing from the principle of the present disclosure, and these modifications and improvements shall also fall within the scope of the present disclosure.

What is claimed is:

1. An array substrate, comprising a plurality of pixel units, wherein each of the pixel units comprises a plurality of sub-pixels, each of the sub-pixels comprises a pixel electrode, and the pixel electrode comprises a plurality of strip-shaped sub-pixel electrodes arranged in a comb-teeth form, and the sub-pixels of one of the pixel units comprise at least two sub-pixels,
   wherein a width of one of the strip-shaped sub-pixel electrodes of any one of the at least two sub-pixels is different from a width of one of the strip-shaped sub-pixel electrodes of any other one of the at least two sub-pixels, or an interval between the strip-shaped sub-pixel electrodes of any one of the at least two sub-pixels is different from an interval between the strip-shaped sub-pixel electrodes of any other one of the at least two sub-pixels, or the width of one of the strip-shaped sub-pixel electrodes of any one of the at least two sub-pixels is different from the width of one of the strip-shaped sub-pixel electrodes of any other one of the at least two sub-pixels and the interval between the strip-shaped sub-pixel electrodes of any one of the at least two sub-pixels is different from the interval between the strip-shaped sub-pixel electrodes of any other one of the at least two sub-pixels,
   wherein the sub-pixels of the one pixel unit at least comprise a red sub-pixel, a green sub-pixel, a blue sub-pixel, and a white sub-pixel,
   and wherein an interval between the strip-shaped sub-pixel electrodes of the red sub-pixel is larger than an interval between the strip-shaped sub-pixel electrodes of the green sub-pixel, and an interval between the strip-shaped sub-pixel electrodes of the blue sub-pixel is smaller than the interval between the strip-shaped sub-pixel electrodes of the green sub-pixel.

2. The array substrate according to claim 1, wherein the numbers of the strip-shaped sub-pixel electrodes of the at least two sub-pixels are different.

3. The array substrate according to claim 1, wherein the sub-pixels of the one pixel unit comprise at least one sub-pixel, and a ratio of the width of the strip-shaped sub-pixel electrode of the least one sub-pixel to the interval between the strip-shaped sub-pixel electrodes of the least one sub-pixel is less than 1.

4. The array substrate according to claim 1, wherein an interval between the strip-shaped sub-pixel electrodes of the white sub-pixel is equal to the interval between the strip-shaped sub-pixel electrodes of the green sub-pixel, and a width of the strip-shaped sub-pixel electrode of the white sub-pixel is equal to a width of the strip-shaped sub-pixel electrode of the green sub-pixel.

5. The array substrate according to claim 1, wherein an optical path difference of a display panel comprising the array substrate is 275 nm, and each of a width of the strip-shaped sub-pixel electrode of the red sub-pixel and a width of the strip-shaped sub-pixel electrode of the blue sub-pixel is less than the width of the strip-shaped sub-pixel electrode of the green sub-pixel.

6. A display panel, comprising the array substrate according to claim 1.

7. The display panel according to claim 6, wherein a transmittance of the display panel is greater than a preset threshold.

8. A display device, comprising the display panel according to claim 7.

9. A display device, comprising the display panel according to claim 6.

10. The display panel according to claim 6, wherein the numbers of the strip-shaped sub-pixel electrodes of the at least two sub-pixels are different.

11. The display panel according to claim 6, wherein the sub-pixels of the one pixel unit comprise at least one sub-pixel, and a ratio of the width of the strip-shaped sub-pixel electrode of the least one sub-pixel to the interval between the strip-shaped sub-pixel electrodes of the least one sub-pixel is less than 1.

12. The display panel according to claim 6, wherein an interval between the strip-shaped sub-pixel electrodes of the white sub-pixel is equal to the interval between the strip-shaped sub-pixel electrodes of the green sub-pixel, and a width of the strip-shaped sub-pixel electrode of the white sub-pixel is equal to a width of the strip-shaped sub-pixel electrode of the green sub-pixel.

13. The display panel according to claim 6, wherein an optical path difference of a display panel comprising the array substrate is 275 nm, and each of a width of the strip-shaped sub-pixel electrode of the red sub-pixel and a width of the strip-shaped sub-pixel electrode of the blue sub-pixel is less than the width of the strip-shaped sub-pixel electrode of the green sub-pixel.

14. A method for designing a display panel, wherein the display panel comprises an array substrate, the array substrate comprises a plurality of pixel units, wherein each of the pixel units comprises a plurality of sub-pixels, each of the sub-pixels comprises a pixel electrode, and the pixel electrode comprises a plurality of strip-shaped sub-pixel electrodes arranged in a comb-teeth form, and the sub-pixels of one of the pixel units comprise at least two sub-pixels,
   wherein the method comprises:
   a testing step for testing a transmittance of the display panel, to determine whether the transmittance of the display panel satisfies a preset threshold;
   a determining step for determining the display panel to be a standard display panel in response to determining that the transmittance of the display panel satisfies the preset threshold; and
   an adjusting step for adjusting, in response to determining that the transmittance of the display panel does not satisfy the preset threshold, a width W of one of the strip-shaped sub-pixel electrodes of at least one of the sub-pixels in one of the pixel units of the array substrate, or an interval S between the strip-shaped sub-pixel electrodes of the at least one sub-pixel, or both the width W of the one strip-shaped sub-pixel electrode of the at least one sub-pixel and the interval S between the strip-shaped sub-pixel electrodes of the at least one sub-pixel, and returning to the testing step, wherein the sub-pixels of the one pixel unit at least comprise a red sub-pixel, a green sub-pixel, a blue sub-pixel, and a white sub-pixel, and wherein an interval between the strip-shaped sub-pixel electrodes of the red sub-pixel is larger than an interval between the strip-shaped sub-pixel electrodes of the green sub-pixel, and an interval between the strip-shaped sub-pixel electrodes of the blue sub-pixel is smaller than the interval between the strip-shaped sub-pixel electrodes of the green sub-pixel.

* * * * *